US009785908B2

(12) United States Patent
Spiegel

(10) Patent No.: US 9,785,908 B2
(45) Date of Patent: Oct. 10, 2017

(54) DELIVERING ORDERED ITEMS TO AN APPROPRIATE ADDRESS

(71) Applicant: Amazon Technologies, Inc., Reno, NV (US)

(72) Inventor: Joel R. Spiegel, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 50 days.

(21) Appl. No.: 14/507,581

(22) Filed: Oct. 6, 2014

(65) Prior Publication Data

US 2015/0026089 A1 Jan. 22, 2015

Related U.S. Application Data

(62) Division of application No. 12/562,987, filed on Sep. 18, 2009, now Pat. No. 8,856,013, which is a division of application No. 10/287,454, filed on Nov. 4, 2002, now Pat. No. 7,610,224.

(60) Provisional application No. 60/339,869, filed on Nov. 2, 2001.

(51) Int. Cl.
G06Q 40/00 (2012.01)
G06Q 10/08 (2012.01)
G06Q 30/02 (2012.01)
G06Q 30/06 (2012.01)
G06F 17/30 (2006.01)

(52) U.S. Cl.
CPC ..... *G06Q 10/083* (2013.01); *G06F 17/30386* (2013.01); *G06F 17/30873* (2013.01); *G06Q 10/087* (2013.01); *G06Q 10/0838* (2013.01); *G06Q 30/02* (2013.01); *G06Q 30/0601* (2013.01); *G06Q 30/0635* (2013.01)

(58) Field of Classification Search
None
See application file for complete search history.

(56) References Cited

U.S. PATENT DOCUMENTS

| 5,426,594 | A | 6/1995 | Wright et al. |
| 5,960,411 | A | 9/1999 | Hartman et al. |
| 5,983,200 | A | 11/1999 | Slotznick |
| 6,125,352 | A | 9/2000 | Franklin et al. |
| 6,336,100 | B1 | 1/2002 | Yamada |
| 6,457,012 | B1 * | 9/2002 | Jatkowski ......... G06F 17/30569 700/226 |

(Continued)

*Primary Examiner* — Shay S Glass
*Assistant Examiner* — Russell S. Glass
(74) *Attorney, Agent, or Firm* — Robert C. Kowert; Meyertons, Hood, Kivlin, Kowert & Goetzel, P.C.

(57) ABSTRACT

A method, system, and computer-readable medium for automatically determining appropriate delivery information for one or more items of an order or potential order is described. A variety of types of information can be considered when determining what delivery information is appropriate for one or more items, such as a type of the items, the particular items, relationships of the items to other items, information about the purchaser, and/or information about the recipient. In addition, the automatic determination of an appropriate address for an item being ordered or potentially ordered by a user can be made in a variety of ways, such as based on inferences from past behavior when ordering items, on inferences from information about the item and from available delivery information for the user, and/or on previous explicit indications from the user.

20 Claims, 11 Drawing Sheets

(56) References Cited

U.S. PATENT DOCUMENTS

| | | |
|---|---|---|
| 7,013,292 B1 | 3/2006 | Hsu et al. |
| 7,096,189 B1 | 8/2006 | Srinivasan |
| 7,127,427 B1 | 10/2006 | Casper |
| 7,203,315 B1 | 4/2007 | Livesay |
| 7,212,976 B2 | 5/2007 | Scheer |
| 8,856,013 B1 | 10/2014 | Spiegel |
| 2002/0072986 A1 | 6/2002 | Aram |
| 2004/0002903 A1 | 1/2004 | Stolfo et al. |
| 2006/0173781 A1* | 8/2006 | Donner .................. G06Q 10/02 705/50 |

* cited by examiner

Add New Procurement Option

| | | |
|---|---|---|
| IP Address: | 127.53.22.13 | |
| | AND/OR | |
| EMAIL Address: | Sally@xyz.com | } 213 |
| | AND/OR | |
| Phone Number: | 206-555-5555 | |

OR

| | | |
|---|---|---|
| Name: | Sally Smith | |
| Address Line 1: (or company name) | c/o ABC Club | |
| Address Line 2: | 11111 Main St. | |
| City: | Seattle | } 214 |
| State: | WA ▼ | |
| Country: | USA | |
| ZIP Code: | 98100 | |

Shipping Method: ⦿ Standard ◯ 2nd Day Air ◯ Next Day Air ~ 217

| | | |
|---|---|---|
| Credit Card No.: | 1111-1111-1111-1111 | |
| Credit Card Type: | Mastercard ▼ | } 216 |
| Credit Card Exp.: | 01/02 | |

Option Moniker: Sally's PDA ~ 218

Include address in 1-Click display: ✓ ~ 219

Use As Default For: All Music ☐ 220a  Jazz Music ☐ 220b  All Video ☐ 220c  ... } 220

*Fig 2*

Example Item Type-To-Delivery Address mapping

| | | Item Type 1 | Item Type 2 | Item Type 3 | ... | Item Type N |
|---|---|---|---|---|---|---|
| 411 | Delivery Address 1 | x | | | | |
| 413 | Delivery Address 2 | | x | | | |
| 415 | Delivery Address 3 | | x | | | x |
| | ⋮ | | | | | |

*Figure 4*

DELIVERING ORDERED ITEMS TO AN APPROPRIATE ADDRESS

CROSS REFERENCE TO RELATED APPLICATIONS

This application is a divisional of U.S. patent application Ser. No. 12/562,987, filed Sep. 18, 2009, now U.S. Pat. No. 8,856,013, which is a divisional of U.S. patent application Ser. No. 10/287,454, filed Nov. 4, 2002, now U.S. Pat. No. 7,610,224, which claims the benefit of provisional U.S. Patent Application No. 60/339,869, filed Nov. 2, 2001, which are all hereby incorporated by reference in their entirety.

This application is also related to U.S. patent application Ser. No. 09/151,617, filed Sep. 11, 1998, now U.S. Pat. No. 7,222,087, which is a continuation-in-part of U.S. patent Ser. No. 09/046,503, filed on Mar. 23, 1998, now abandoned, and of U.S. patent Ser. No. 08/928,951, filed on Sep. 12, 1997, now U.S. Pat. No. 5,960,411; and to U.S. patent Ser. No. 09/547,540, filed Apr. 12, 2000, which claims the benefit of provisional U.S. Patent Application No. 60/171,947, filed Dec. 23, 1999, and of U.S. Patent Application No. 60/190,264, filed Mar. 17, 2000. Each of these related patent applications is herein incorporated by reference in their entirety.

TECHNICAL FIELD

The following disclosure relates generally to ordering and delivering items, and more particularly to automatically assisting in delivering ordered items in an appropriate manner.

BACKGROUND

The Internet comprises a vast number of computers and computer networks that are interconnected through communication links. These computers exchange information using various services, such as electronic mail, FTP, Gopher, and the World Wide Web ("the WWW" or "the Web"). The Web is a system for publishing information in which users may use a Web browser application to retrieve information (e.g., Web pages) from Web servers and display that information.

The Web has also increasingly become a medium that is used to shop for and order items (such as products and/or services) that are for purchase, rent, lease, license, trade, evaluation, sampling, etc. Some such items may be available to be delivered electronically to a purchaser over the Internet (e.g., music), while other items (e.g., paperback books) may instead be delivered through physical distribution channels (e.g., a common carrier). In many circumstances, a user can visit the Website (or "Web site") of a Web merchant that sells an item, view information about the item, give an instruction to purchase the item, and provide information needed to complete the purchase (e.g., payment and shipping information). After receiving an order for one or more items, the Web merchant then fulfills the order. The order fulfillment process typically used by Web merchants for items that are to be physically shipped shares similarities with other item ordering services that ship ordered items (e.g., catalog-based shopping, such as from mail-order companies).

The ordering of items from a Web merchant is often based on the "shopping cart" model. In that model, when a purchaser selects an item, the merchant's server computer system metaphorically adds that item to a shopping cart for the purchaser. When the purchaser is done selecting items, then all the items in the shopping cart are "checked out" (i.e., ordered) when the purchaser provides billing and shipment information. In some models, when a purchaser selects any one item, then that item is "checked out" by automatically prompting the user for the billing and shipment information.

Although shopping at a Web merchant can provide various advantages, shopping at conventional Web merchants is not always as convenient as it might be. For example, many conventional Web merchants may allow (at most) only a single delivery address and delivery manner (e.g., type of shipping) to be associated with each user, thus making it difficult for users to send different items to different locations and/or in different manners. Moreover, even if a conventional Web merchant allows multiple different delivery addresses and delivery manners to be associated with a user, such Web merchants typically do not provide advanced tools to allow a user to easily manage the use of the various delivery addresses and delivery manners, such as to automatically associate delivery addresses and/or delivery manners with groups of one or more items that may be ordered by the user.

Thus, it would be beneficial to have a more convenient approach to determining how to deliver one or more items that are ordered by a user. In particular, it would be beneficial to allow multiple delivery addresses and/or delivery manners to be associated with a user, and to provide various mechanisms to allow the user to easily manage the use of the various associated delivery addresses and delivery manners.

BRIEF DESCRIPTION OF THE DRAWINGS

FIG. 2 illustrates an example of gathering a new delivery address and other information for use in procurement of items.

FIG. 4 illustrates an example of a mapping between item types and delivery addresses.

DETAILED DESCRIPTION

Figure 1A:
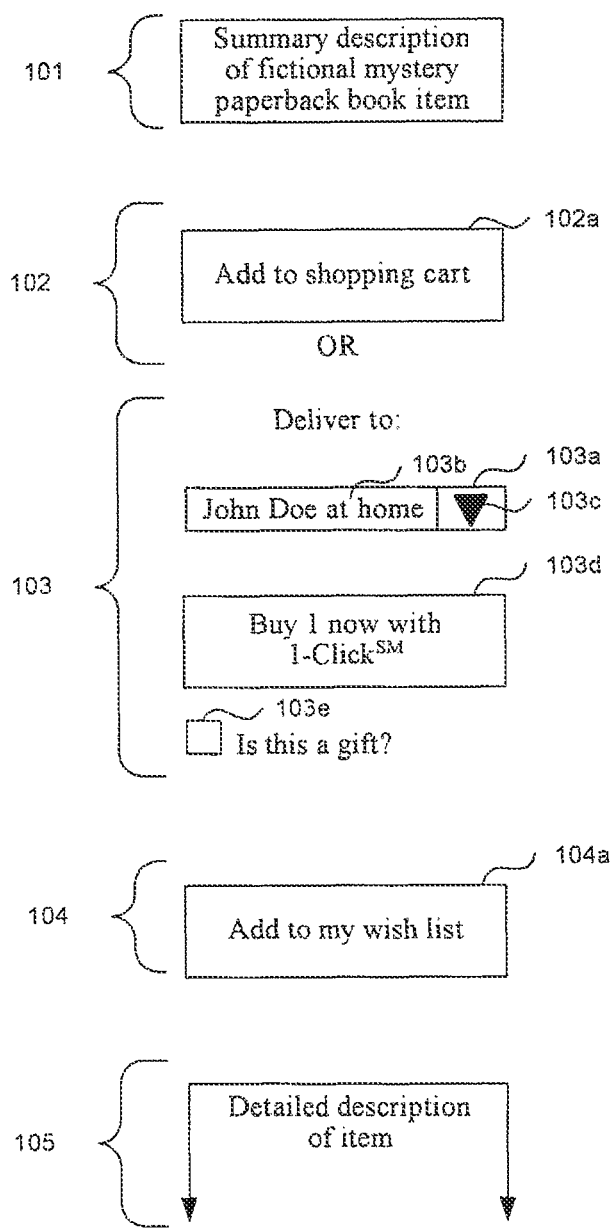
FIGS. 1A-1D illustrate examples of automatically determining appropriate delivery information for an item.

Techniques are described for assisting with the order and delivery of items, such as in a client/server environment. In some embodiments, appropriate delivery information (e.g., an appropriate delivery address) is automatically determined for use with one or more items of an order, and may then be used to assist in the delivery of those items.

Appropriate delivery information for an order can be automatically determined and used at various times during the ordering process, including to complete an actual order when it is placed. Appropriate delivery information may also be determined for one or more items of an in-progress order that are stored in an intermediate state (e.g., upon placement of the items into a shopping cart) and/or for one or more items of a potential order before an ordering process for those items has been initiated (e.g., when a user views a detailed description of the item but has not yet committed to ordering the item, such as by placing the item in a shopping cart). Unless otherwise specified, references to orders should therefore be construed as including completed orders, orders that are in-progress or in an intermediate state, and potential orders for which the user has not yet initiated the ordering process.

After appropriate delivery information is automatically determined, it can be used in various ways. In particular, after appropriate delivery information is automatically determined, it can be indicated to the user, e.g., by displaying the determined delivery information to the user as a user-modifiable default for confirmation or to allow modification. Conversely, in some embodiments automatically determined appropriate delivery information may be used as part of the order fulfillment process without notification to and/or confirmation by the user placing the order, such as when the delivery information is not automatically determined until after the ordering process is complete.

Appropriate delivery information for one or more items of an order can be determined in various ways using a variety of types of information. In some embodiments, information about the items to be delivered may be used, such as a type of the items (e.g., a book versus software, or a technical manual book versus a fictional mystery novel book) or the relationship of the items to other items (e.g., being part of a predefined group of items), when determining the appropriate delivery information for the items. In other embodiments, other types of information can be considered when determining appropriate delivery information for items, including information associated with the user placing the order (e.g., information about the past ordering behavior of the user), information about the recipient, information about a current time (e.g., to give preference to a home address for orders placed on the weekend and to a work address for orders placed during normal working hours) and/or information about a current physical location of the user (e.g., to give preference to a home address for orders placed from home and to a work address for orders placed from work) that may be explicitly identified or instead presumed based on available information such as an IP address or cookie. It will therefore be appreciated that different delivery information may be selected for the same item when purchased by a user in different circumstances.

The automatic determining of appropriate delivery information for an order based on the various types of information can be performed in a variety of ways. In some situations, information associated with the user placing the order is used to automatically determine appropriate delivery information, such as by analyzing past ordering behavior of the user in order to infer appropriate delivery information for a current order and/or by using preference information or other previous indications from the user (e.g., explicit indications of delivery information to be used for a specified type of item). For example, with respect to past behavior of a particular user, that user may have previously ordered several technical books that are related to his job and had them delivered to work, and may also have previously ordered various CDs and fictional mystery novels for personal pleasure and had them delivered to his home. If so, when a current order of a mystery novel or a CD is considered for the user, a delivery address for the user's home may be determined to be the most appropriate based on the user's past behavior. Also, if a recipient of an order is identified as being someone other than the user placing the order, similar information for the recipient can also be used when determining appropriate delivery information, whether instead of or in addition to the information for the user. In addition, in some situations information about the item itself is used to automatically determine appropriate delivery information, such as by identifying a type of delivery information that is typically appropriate for a type of the item (e.g., children's books typically being delivered to a home address rather than a work address, perishable food typically being delivered using the fastest available manner of delivery, or heavy or inexpensive items typically being delivered using the least expensive available manner of delivery).

Alternatively, when an item is available to be delivered electronically (e.g., music or other audio information, video information, software, an electronic book, etc.), the automatic determination of appropriate delivery information may in some embodiments give preference to (or only consider) electronic delivery addresses that are most appropriate for that type of item. For example, assuming a networked home environment with multiple devices that can receive information, streaming audio may be delivered to a home stereo for instant playing, a complete audio file may be delivered to a permanent storage device for later retrieval, personal computer software may be delivered to one or more of multiple personal computers, an electronic book (whether raw data or a data structure) may be delivered to an electronic book reader device, a video may be delivered to a TV or associated set-top box device, etc. A variety of devices could thus be used as destinations for delivery addresses, such as personal computers, network devices, internet appliances, PDAs, wireless phones, pagers, electronic organizers, printers, display devices, storage devices, television-based systems, and various other consumer products that include inter-communication capabilities. Moreover, electronic delivery may in some situations include delivering a single item to multiple destinations (e.g., concurrently presenting the item to the user and storing the user for later retrieval). Electronic delivery of an item can be accomplished in a variety of ways, such as based on using different network addresses (e.g., IP addresses) for each available destination device and/or based on various other communications standards (e.g., wireless standards such as Bluetooth and the IEEE 802.11b Ethernet standard, and/or more general communications protocols such as DNS and TCP/IP).

More generally, items can be ordered in a variety of ways, and various techniques for ordering items are discussed in greater detail in U.S. patent application Ser. No. 09/151,617 and in U.S. patent application Ser. No. 09/547,540. In some embodiments, a multi-procurement option ordering is provided in which each user (or customer) of an item ordering service can have multiple defined alternative procurement options that can each be used to complete the ordering of one or more items. Each procurement option can have a unique set of user-specific order information (e.g., payment information, delivery address, delivery instructions, shipping instructions, wrapping instructions, etc.), can have a unique moniker (e.g., a short name such as "home," partial payment information, partial delivery address information, recipient name, etc.), and can have a variety of types of recipients (e.g., the user, an individual other than the user, a group of recipients, etc.) to whom ordered items will be delivered. In some embodiments, each user can also have one of their procurement options designated as their primary or default procurement option.

When multiple procurement options are defined for a user placing an order, those procurement options can be used in conjunction with the automatic determination of appropriate delivery information in various ways. For example, the delivery information that is associated with a user's procurement options (e.g., delivery addresses, delivery instructions, and/or shipping instructions) can provide one basis for identifying available types of delivery information for a user. In addition, when delivery information is automatically determined to be appropriate for an order by a user and that delivery information is associated with one of the user's procurement options, that procurement option can in some embodiments be selected as the default procurement option for use in ordering that item or as the only procurement option that is made available for ordering that item. For example, if a user has requested information about an item and delivery information associated with one of the user's procurement options has been determined to be appropriate for a potential order for the item, that one procurement option could be selected as the initial default procurement option for that item (and thus may be initially selected when information about ordering that item is displayed). Alternatively, when items are placed in a shopping cart, appropriate delivery information could be determined for the items (whether individually or in various groups) and displayed to the user, such as user-modifiable defaults.

For illustrative purposes, some embodiments are described below in which appropriate delivery address information is automatically determined for an item based on a type of the item, such as by selecting a procurement option associated with a user placing a order for the item that includes that delivery address information so that the selected procurement option can be used to complete and fulfill the order. However, those skilled in the art will appreciate that the techniques of the invention can be used in a wide variety of other situations, some of which are discussed below, and that the invention is not limited except by the appended claims.

FIGS. 1A-1D illustrate examples of automatically determining an appropriate delivery address and other delivery information for an item. In these examples, multiple procurement options have been previously defined for a user "John Doe" who is currently considering potential orders for various items, and a selected one of those procurement options is initially displayed along with other information for each item. In these examples, the initially displayed procurement option has been automatically selected based on an automatic determination that the delivery address and other delivery information associated with the selected procurement option is the most appropriate for the current item if ordered.

In particular, FIG. 1A illustrates the display of a Web page that describes an item that is a paperback book of the fictional mystery genre. This example Web page was sent from a Web merchant's server system to a client system when the user of the client system requested to review information about the item, but before an indication is received from the user to order the item. The example Web page contains a summary description section 101, a shopping cart addition section 102, a multi-procurement option ordering section 103, a wish list addition section 104, and a detailed description section 105. In the illustrated Web page, the summary description and detailed description sections provide information about the paperback book item.

In this example, before the Web page was sent to the client system, the Web merchant's system determined an appropriate delivery address for that item if ordered by that user based on various information about the item and the user. In the illustrated embodiment, the Web merchant's system has determined that the delivery address associated with a procurement option whose moniker is "John Doe at home" is the appropriate delivery address, and then selected that procurement option as a current procurement option for this item when the Web page is initially displayed. In this example, the current procurement option was selected based at least in part on the procurement option's delivery address being the home address of the user and on the type of the item (e.g., any book, any paperback book, or books of the mystery genre) being determined to be appropriate to be sent to the user's home. The user can then order the item by selecting the single-action ordering button 103*d* and using the automatically selected delivery address and other information associated with the automatically selected procurement option. Alternatively, the user can select another delivery address in the illustrated embodiment using a control 103*c* to select a drop-down menu of procurement options for the user.

As noted previously, the selection of the current procurement option for this example item can be made in various ways, such as based on previous explicit instructions from the user (e.g., to use the "John Doe at home" procurement option for any books of the mystery genre), based on inferences from previous behavior (e.g., all previously ordered paperback books have been delivered to John Doe's home address, such as by using the "John Doe at home" procurement option and/or another defined procurement option with that delivery address), based on inferences about the type of item and/or about the type of delivery address (e.g., items of this type are generally sent to users' home addresses rather than to their work addresses), etc.

In addition, in some embodiments the accuracy and/or effectiveness of the automatic determining of appropriate delivery information is improved over time by incorporating feedback from the user (whether explicit or implicit). For example, when the user chooses a different procurement option than the initially selected procurement option and uses the newly selected procurement option to complete an order for the item, the differences between the delivery address and/or other delivery information of the two procurement options can be noted and used to adjust future determinations of appropriate delivery information for this item and/or for similar items for this user and/or other users. In other situations, a user may provide explicit feedback about automatically determined delivery information and/or a selected procurement option (e.g., based on prompting from the system), and if so such explicit feedback can similarly be used to adjust future determinations of appropriate delivery information.

Figure 1B:
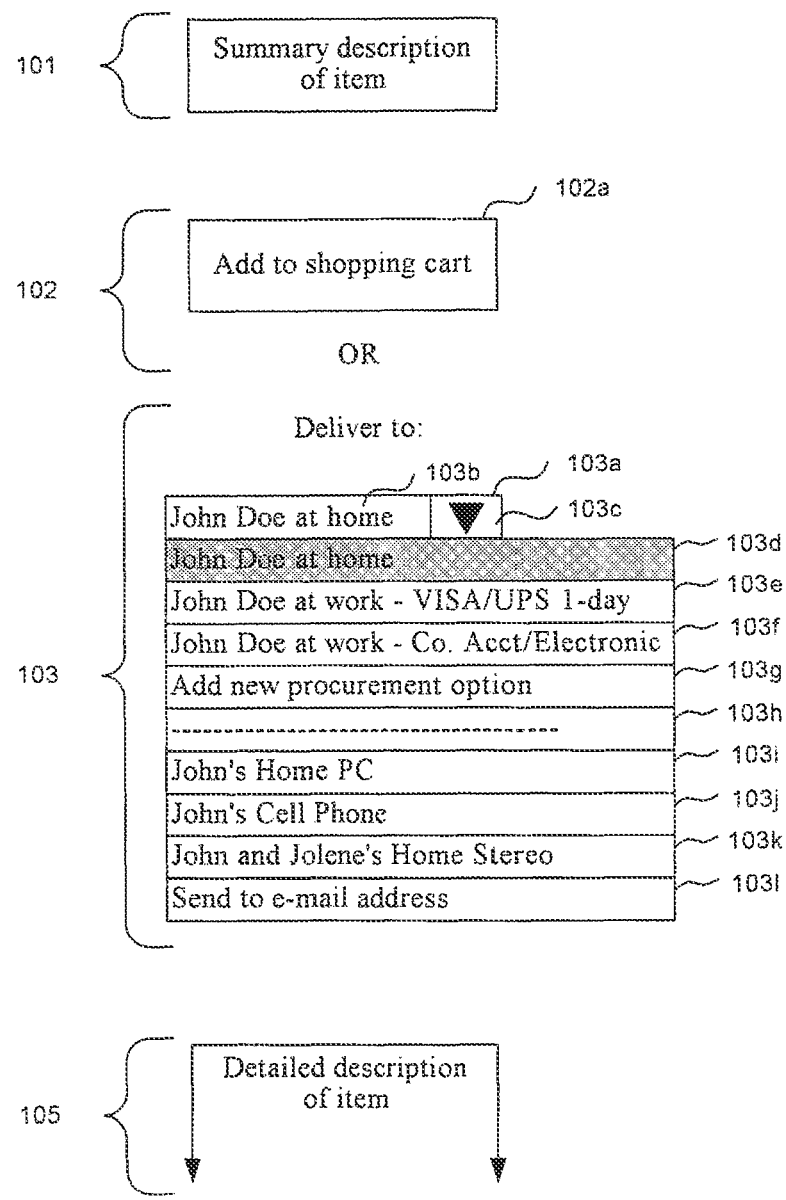

FIG. 1B illustrates the display of various example procurement options and related information that are available to John Doe by use of a drop-down menu. In the illustrated embodiment, the list of options in the dropdown menu begins with the automatically selected procurement option. The procurement options in the list can be placed in a variety of orders, such as based on their respective determined degrees of appropriateness for the current item, based on a user's preference (e.g., by placing a user's default procurement option first in the list), or based on the price or other characteristic associated with the procurement options. In the illustrated embodiment, the procurement options include options 103*d*-103*f* that have various associated physical delivery addresses and options 103*i*-103*k* that have associated electronic delivery addresses. In some embodiments, procurement options that are not appropriate for the current item (e.g., procurement options having electronic delivery addresses when the current item is a physical item such as a paperback or hardback book) may not be displayed or may be displayed in a manner to indicate that they are not currently available for use.

Electronic delivery addresses can be specified in a variety of ways. In some embodiments, any device or logical destination to which information can be electronically transmitted may have one or more electronic delivery addresses (e.g., an individual IP address or any other form of network address). Various delivery instructions associated with such electronic addresses can additionally control a delivery manner in which information is to be transferred, such as passwords or other information needed for electronic access, instructions for encrypting the information to be transmitted in a particular manner, and/or one or more specified actions to be taken as part of the delivery.

If the user selects the "add new procurement option" 103g, the user may be presented with a Web page for gathering new procurement option information. An example of a form for gathering new procurement option information is illustrated in FIG. 2. The procurement option information to be specified can include a variety of types of information, such as payment information 216 and moniker information 218. In the illustrated embodiment, the user can define a new procurement option that has a physical delivery address and associated physical delivery manner instructions, such as by specifying name and delivery address information 214 and shipping instructions 217, or a new procurement option that has an electronic delivery address and associated electronic delivery manner instructions (not shown), such as by specifying information for one or more of the electronic delivery address selections 213. In other embodiments, different dropdown list selections and corresponding information input screens may be used to define procurement options that have physical delivery addresses and that have electronic delivery addresses. The illustrated types of electronic delivery address selections, which include an IP address, an email address and a phone number (e.g., for a modem, fax, cell phone, pager, etc.), are merely examples, and in other embodiments a variety of other types of electronic delivery addresses and/or types of electronic delivery instructions may be specified. In addition, some of the illustrated types of information may also be optional or not requested in other embodiments, such as the moniker, and/or requests for various other additional types of information (e.g., an administrative contact phone number) may be present.

As previously noted, in some embodiments a user may provide explicit instructions about procurement options that are to be automatically used in future ordering situations of specified types. In the illustrated embodiment, the user is provided with various instruction mapping selections 220, such as to use the procurement option being defined as a default for any future music selections that are ordered; for music of a particular genre, such as jazz; for music encoded in particular manners (not shown), such as streaming audio or only single tracks rather then entire compilations (e.g., an entire CD) and samples; for a variety of other types of digital and/or electronic information, such as audio; etc. In other embodiments, such instruction usage selections may not be present, a variety of other such selections may be additionally available, and instruction usage selections may instead be made at times other than creation of a new procurement option.

In other embodiments, procurement options having electronic delivery addresses may be defined or determined in other manners. For example, it may be possible to specify an electronic delivery address and/or define a procurement option having such an electronic delivery address by sending a message that includes an electronic delivery address, such as from a device having that electronic delivery address. Alternatively, the client system and/or server system may be able to automatically identify relevant electronic delivery addresses for the user (e.g., from a defined profile for the user, from prior interactions by the client system with such electronic delivery addresses, from a record of electronic devices that the user may have purchased in the past from the online merchant, from a list of registered electronic devices that the manufacturer of the electronic devices may have provided to the online merchant, and/or from dynamic querying of those or other devices), and may then use some or all of such identified electronic delivery addresses as electronic delivery address alternatives for the user.

Figure 1C:
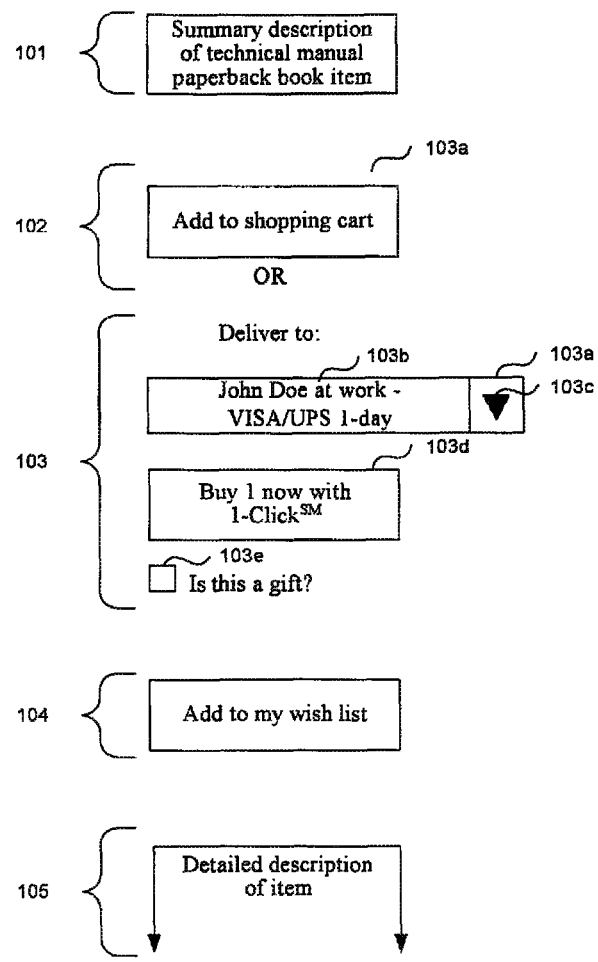
Figure 1D:
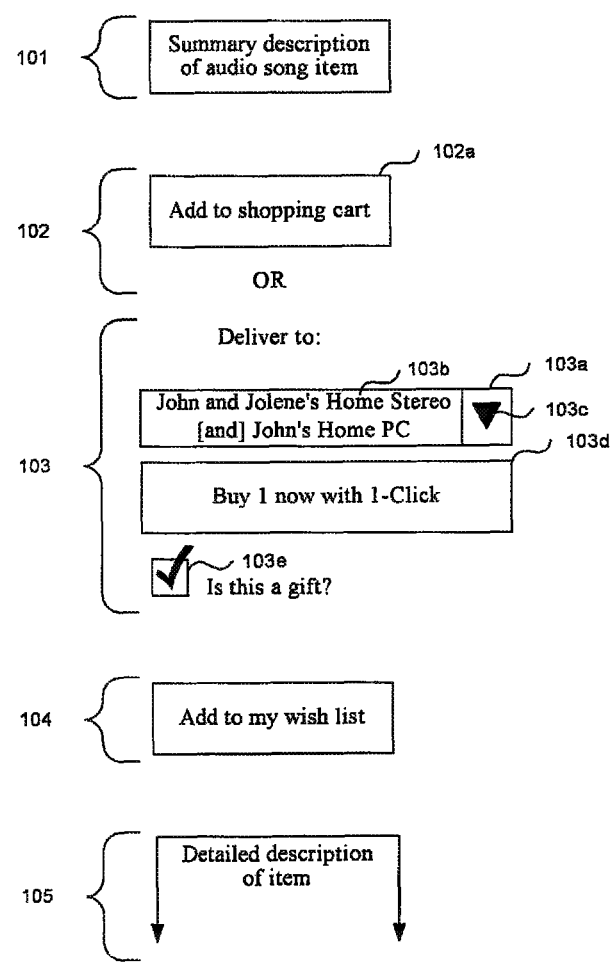

FIGS. 1C and 1D provide examples similar to the example illustrated in FIG. 1A, but in which other items are considered and in which other procurement options are selected as having appropriate delivery addresses for the items. For example, FIG. 1C illustrates the display of a Web page that describes an item that is a paperback technical manual, and the summary description and detailed description sections of the Web page correspondingly provide information about that item. In the illustrated embodiment, the Web merchant's system determines that the delivery address associated with a procurement option whose moniker is "John Doe at work—VISA/UPS 1-day" is an appropriate delivery address for this item, and thus selects that procurement option as a current procurement option when the Web page is initially displayed. In this example, the work address of the user was selected as the appropriate delivery address because the type of the item (e.g., books that are technical manuals or books by this particular author or publisher) was determined to be appropriate to be sent to the user's work address.

FIG. 1D illustrates the display of a Web page that describes an item that is an audio version of a song, and the summary description and detailed description sections of the Web page correspondingly provide information about that item. In the illustrated embodiment, the Web merchant's system determines that if ordered the item should be delivered to two electronic delivery addresses, those being a home stereo (e.g., for immediate playback) and a home personal computer (e.g., for storage). Correspondingly, the server system selects indications of the two electronic delivery addresses to be initially displayed with the Web page. In this example, the electronic delivery addresses for the user's home PC and stereo were selected based at least in part on these delivery addresses being appropriate for the type of the item (e.g., being able to process audio data).

It will be appreciated that for some items, both physical delivery addresses and electronic delivery addresses may be appropriate, such as if one version of the item could be electronically delivered (e.g., the data) and that or another version of the item could be physically delivered (e.g., a device-readable medium containing the data, such as a CD or DVD), and if so such items may in some embodiments be delivered to multiple delivery addresses that include both an electronic delivery address and a physical delivery address. Conversely, in other embodiments only a single delivery address may be allowed for an item, and/or only a single procurement option may be allowed to be selected at a time for current use.

Figure 3:
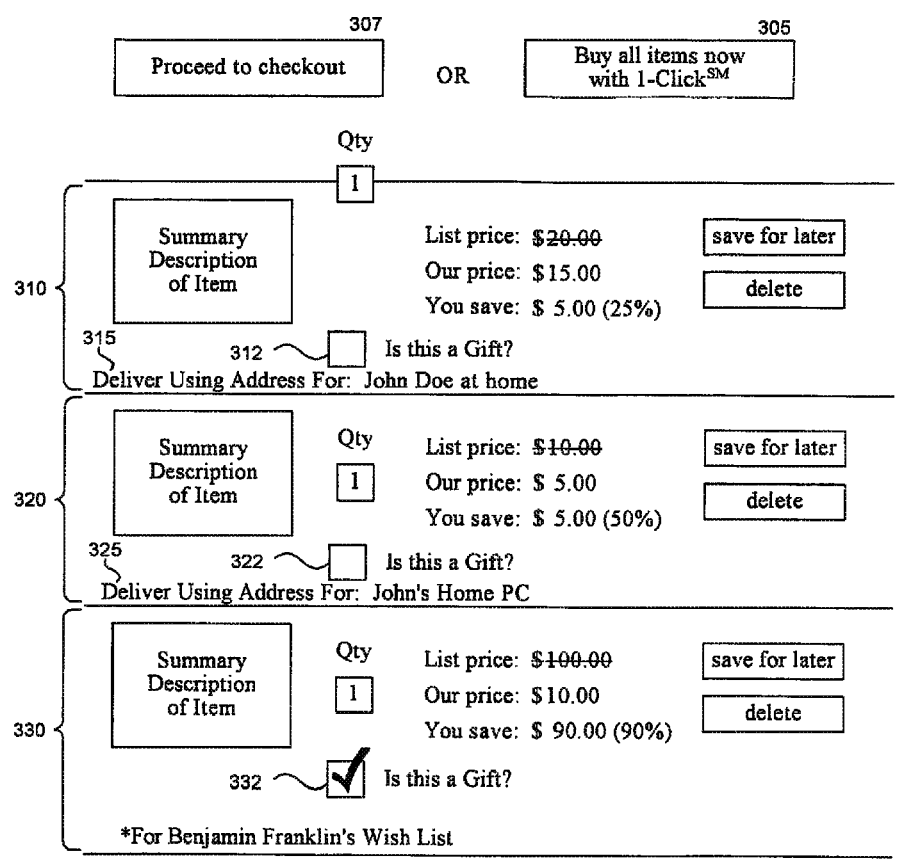
FIG. 3 illustrates an embodiment of automatically determining appropriate delivery information for items in a user's shopping cart.

As previously noted, appropriate delivery addresses can also be determined at various times before, during, and after the item ordering process. FIG. 3 illustrates an embodiment of automatically determining appropriate delivery addresses and other delivery information for items in a user's shopping cart. In particular, the illustrated shopping cart includes three items, those being 310, 320, and 330. Item 330 is indicated as having been added to the shopping cart from Benjamin Franklin's Wish List, and in the illustrated embodiment has a default associated delivery address corresponding to that wish list item entry. Items 310 and 320 have associated delivery addresses that were automatically determined for those items using the described techniques. In other embodiments the automatically determined associated delivery addresses may not correspond to procurement options defined for the user.

One option available to the user is to use the Proceed to Checkout button 307 to purchase one or more of the items. If so, the user will be prompted to specify other relevant information necessary to complete the purchase of the items. It will be appreciated that in some embodiments the shopping cart may include one or more dropdown lists (not shown) or other mechanism to allow the user to change the delivery address that was automatically determined for each of the items.

FIG. 4 illustrates an example of a mapping between item types and delivery addresses. In the illustrated embodiment, the mappings are stored as part of a data structure (e.g., a database) for a particular customer (or user), and the item types shown may be specific to that customer (e.g., based on grouping items previously ordered by that customer that were treated similarly) as may be the delivery addresses (e.g., by using delivery addresses to which the customer has previously had items delivered). In other embodiments, one or more similar mappings could be generated and stored based on the actions of a group of users, such as to represent mappings of item types to types of delivery addresses that are typically used by others for those items types, either instead of or in addition to the illustrated mapping. As noted previously, when generating a mapping of this type for a particular customer, the mapping can in some embodiments be generated in whole or in part automatically, while in other embodiments the mapping may be explicitly specified (in whole or in part) by the customer (e.g., by displaying indications of item types and delivery addresses to the customer, such as in the illustrated format, and receiving indications from the customer of the appropriate associations).

In the illustrated embodiment, each column 402-410 represents a distinct type of item and each row 411-415 represents a distinct delivery address associated with the customer to whom the mapping corresponds. As previously discussed, item types can be determined in various ways, and in some embodiments some or all of the item types may represent individual items. In the illustrated embodiment, item types may be mapped to multiple appropriate delivery addresses (e.g., item type 2) or instead may not be currently mapped to any appropriate delivery address (e.g., item type 3). Similarly, some delivery addresses may be appropriate for multiple different item types (e.g., delivery address 3), while other delivery addresses may not currently be appropriate for any illustrated item type (not illustrated). In other embodiments, only a single appropriate delivery address may be allowed for each item type. In addition, in other embodiments, additional types of information could be stored in this or a related mapping, such as to include various delivery manners as an additional dimension to this table (thus mapping a given item type to both one or more delivery address and one or more delivery manners for each such delivery address) or to instead associate one or more such delivery manners directly with each delivery address regardless of item type (e.g., as part of an associated procurement option). Conversely, in some embodiments, some of the illustrated types of information that are included in the mapping may not be stored and/or may be stored in other data structures, and the illustrated associations may be stored in other ways.

Figure 5:
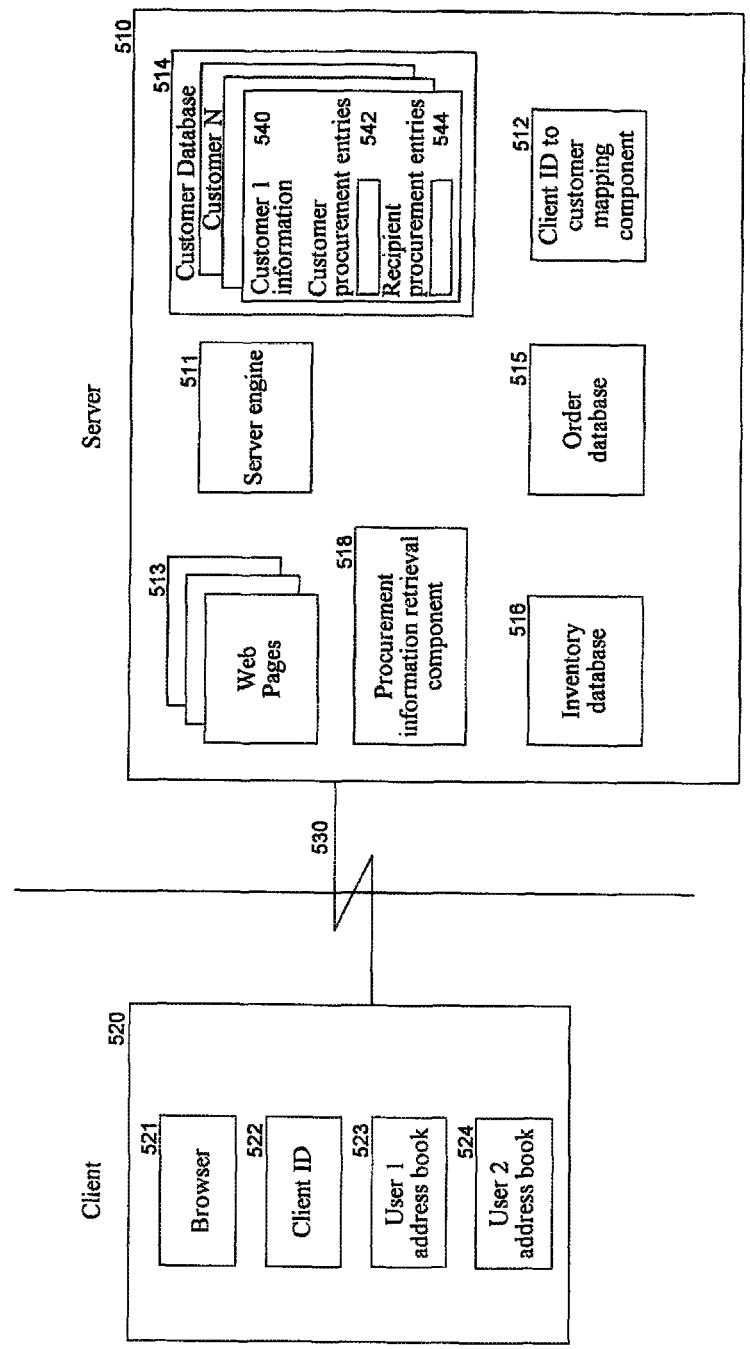
FIG. 5 is a block diagram illustrating an embodiment of a system that assists in item ordering.

FIG. 5 is a block diagram illustrating an embodiment of a system that provides multiple procurement options to assist in item ordering, such as to allow appropriate procurement options to be selected for use with orders based on delivery address and/or other information associated with those procurement options. In the illustrated embodiment, the system works in a Web-based computing environment, and the server system 510 includes a server engine 511 (e.g., a Web server), a client identifier-to-customer mapping component 512, data to construct various Web pages 513, an order database 515, an inventory database 516, and a procurement information retrieval component 518. The server system also includes a customer database 514 which is composed of groups of customer information for various customers, such as Customer 1 information group 540 that contains procurement entries 542 with delivery information for Customer 1 and procurement entries 544 with delivery information for other recipients of orders from Customer 1. The other customer information groups similarly contain customer procurement entries and/or recipient procurement entries for other customers.

The server system receives HTTP requests from various client systems to access Web pages that are identified by URLs, and provides the requested Web pages to the requesting clients. Such HTTP requests may be in response to a user of a client system requesting a Web page that provides information about an item that may be ordered, or instead may be in response to the user performing a multi-procurement option ordering of an item from such a Web page.

When a client system requests a Web page providing information about an item that may be ordered, the server system attempts to add user-specific procurement option information to the Web page. If the identity of the user of that client system has been determined, the server system retrieves information from the customer database 514 about the procurement entries that are stored for the customer, and provides a moniker or other set of partial procurement option information for each enabled procurement option. Such monikers allow the procurement option to be uniquely identified using a minimal amount of space on the screen.

Alternatively, when in the illustrated embodiment an HTTP request indicates that the user has performed multi-procurement option ordering of an item, the HTTP request includes an indication of a procurement option selected for the user (e.g. a user-selected moniker or default moniker) that is to be used to complete the ordering of the item. When the server system receives such an HTTP request, the server system retrieves information about that procurement option from the entries for the customer that are stored in the customer database (e.g., from customer procurement entries 542 when the user is Customer 1 and is ordering an item that is to be delivered to themself), and uses the retrieved information to complete the ordering of the item for the customer. The inventory database 516 can be checked to confirm that the ordered item is available, and the order database 515 can be updated to reflect the new order.

In some instances, an HTTP request indicates that the user has selected to create a new procurement option that is to be used to order the item. If so, the client and server systems attempt to collect sufficient information from the user in order to create a procurement option that is enabled for ordering. The new procurement option is added to the customer information group for the user in the customer database 514, and the information for the new procurement option can then be used to complete the ordering of items. If the client and server systems are not able to collect sufficient information to enable the new procurement option, the procurement information retrieval component can attempt to use the partially specified procurement information to automatically determine the other necessary information. For example, if the user has specified an identity of the recipient but has not specified a delivery address, the retrieval component can attempt to identify the delivery address in a variety of ways. Alternatively, if default information has previously been specified for one or more types of procurement option information, the retrieval component or the server engine can use that default information if the user does not supply alternative information. Even if sufficient information to complete an order cannot be currently identified, a partially specified procurement option can be created and added to the customer database.

A client system such as client 520 can communicate with the server system via a communications mechanism 530 in order to send HTTP requests and receive Web pages from the server. The client system can use a browser 521 to send and receive HTTP messages and to display Web pages. As discussed above, a client system can store a unique client identifier 522 that can be supplied to the server system. In addition, in some embodiments the client system can store one or more address books for various users that may use the client system, such as User 1 address book 523 and User 2 address book 524. If such address books exist for the current user, information in the address books can be used to assist in determining possible recipients for new procurement options, as well as for identifying relevant procurement option information for new procurement options created for such recipients (e.g., delivery addresses). It will be appreciated that such user address books may reside on either the client system or the server system.

One skilled in the art will appreciate that the multi-procurement option ordering techniques can be used in various environments other than the Web. For example, multi-procurement option ordering can also be used in an electronic mail environment in which an item is described in an electronic mail message along with an indication of a selection of a procurement option that is to be used to complete the ordering of the item. Also, various communication channels may be used, such as a local area network, a wide area network, or a point-to-point dial up connection. More generally, a server system may comprise any combination of hardware or software that can generate orders in response to selection of a procurement option, and a client system may similarly comprise any combination of hardware or software that can interact with the server system, including telephone-based or television-based systems or various other consumer products through which orders may be placed.

Figure 6:
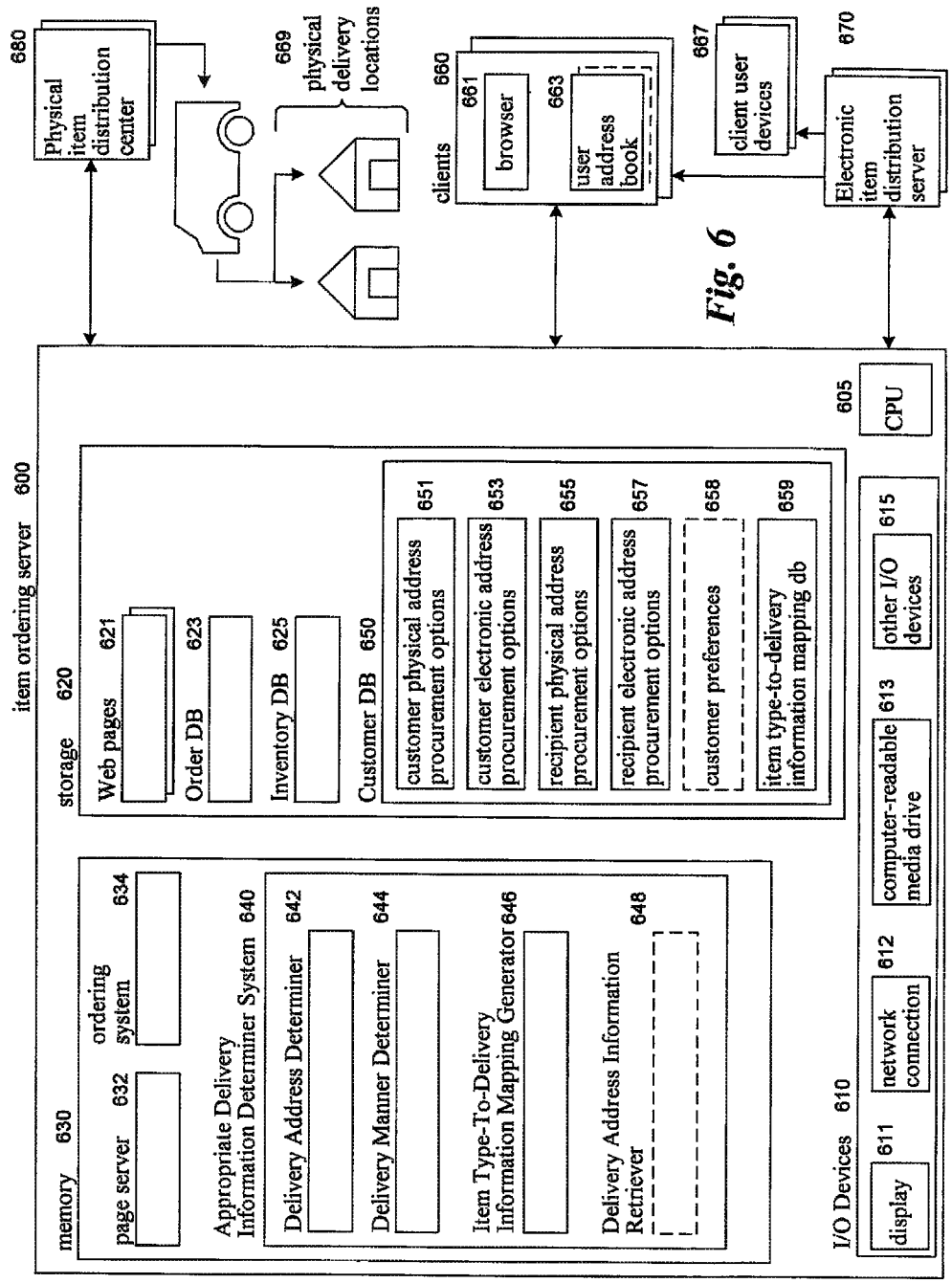
FIG. 6 is a block diagram illustrating an embodiment of a system for determining appropriate delivery information for one or more items.

FIG. 6 is a block diagram illustrating an embodiment of a system for automatically determining appropriate delivery information for one or more items. In particular, FIG. 6 illustrates an item ordering server computer system 600 suitable for executing an embodiment of the Appropriate Delivery Information Determiner system 640, as well as various client computing devices 660 from which users of those devices can interact with the item ordering server. The item ordering server includes a CPU 605, various I/O devices 610, storage 620, and memory 630 The I/O devices include a display 611, a network connection 612, a computer-readable media drive 613, and various other I/O devices 615.

An embodiment of the Appropriate Delivery Information Determiner system is executing in memory, and it includes at least one of a Delivery Address Determiner component 642 and a Delivery Manner Determiner component 644. The Determiner components assist in determining appropriate delivery information for an order or potential order based on types of items in the order and on the user (or customer) placing the order. In the illustrated embodiment, mappings of item types to various forms of delivery information are maintained for various customers of the item ordering server, and the illustrated system additionally includes a component to generate and maintain those mappings, that being the Item Type-To-Delivery Information Mapping Generator component 646. The system may also optionally include a Delivery Address Information Retriever component 648 that is able to obtain information about various delivery addresses associated with a user of the item ordering service in various automated manners.

Users can access the item ordering server in a variety of ways, including via the remote client computing devices 660 (e.g., via the Internet and/or the World Wide Web). A user of such a client can use software or other functionality provided on the client, such as a browser 661, to interact with the item ordering server. In addition, some or all of the clients may store various information specific to users of those clients that can be transmitted to and used by the item ordering server, such as one or more user address books 663 and/or various user preferences (not shown). Information provided to the clients for presentation to users can be presented via a variety of types of output devices (not shown) that are accessible to the clients.

In the illustrated embodiment, users of the clients interact with the item ordering service to obtain information about various items available for ordering and optionally place orders for such items. The item ordering server includes a page server 632 executing in memory to receive and process such requests from the users. In particular, the page server may access various static Web pages 621 on storage or instead dynamically generate appropriate Web pages to be provided to the clients. In the illustrated embodiment, the page server may also access an inventory database 625 on storage to obtain information about various items that are available, and may provide Web pages to the users providing detailed information about such items (e.g., in response to a request for such information). After a user indicates that an order is to be made, the page server can interact with an ordering system 634 executing in memory in order to place the order. The ordering system may itself interact with the inventory database in order to determine availability and other information about the items being ordered, and may record information about the orders that are placed in an order database 623 on storage. The ordering system may also coordinate with one or more external entities to assist in the delivering of the items being ordered, such as one or more physical item distribution centers 680 and/or one or more electronic item distribution server computer systems 670.

In the illustrated embodiment, the page server and/or the ordering system also interact with the Appropriate Delivery Information Determiner system in order to determine appropriate delivery information for items. The page server or the ordering system notifies the Appropriate Delivery Information Determiner system when appropriate delivery information is to be presented to a user or otherwise used by the system. The Appropriate Delivery Information Determiner system then provides information about the one or more items and an indication of the user to the Delivery Address Determiner component and the Delivery Manner Determiner component if present in order to determine appropriate delivery information for the item.

In order to provide appropriate delivery information for a user acting as a customer (whether actual or potential), the Appropriate Delivery Information Determiner system in the illustrated embodiment uses information from a customer database 650 on storage for that user (assuming the user has been a previous customer or that customer information is otherwise available for that user). The illustrated customer database includes various predefined procurement options for the customer that can be used to order items, with each procurement option in the illustrated embodiment including at least one associated delivery address. These delivery addresses can include both one or more delivery addresses from which the customer can receive items (e.g., both a home and a work delivery address) as well as one or more delivery addresses for each of any number of other recipients to whom the customer may have orders delivered (e.g., as gifts). In addition, in embodiments such as the illustrated embodiment, the delivery addresses may include both physical delivery addresses and electronic delivery addresses. Thus, the predefined procurement options in the illustrated embodiment are divided into groups of procurement options that include delivery addresses that are physical delivery addresses for the customer 651, electronic delivery addresses for the customer 653, physical delivery addresses for recipients other than the customer 655, and electronic delivery addresses for other recipients 657. In addition, in the illustrated embodiment a mapping is maintained for each customer from item types to various delivery information, such as in the item type-to-delivery information mapping database 659. Various other information related to the customer, such as optional customer preference information 658, can also be stored in the customer database.

Upon receiving an indication of a potential order for one or more items for a user, the Delivery Address Determiner component first determines one or more item types of the one or more items (e.g., by receiving the item type information from the page server or the ordering system as part of the indication and/or by retrieving item type information from the inventory database). The Delivery Address Determiner component then retrieves indications of delivery addresses to which those item types are mapped from the mapping database for that user. If mapping information is not available for one or more of the items, the Delivery Address Determiner component may interact with the Item Type-To-Delivery Information Mapping Generator component in order to dynamically generate such mapping information. In other embodiments, item type-to-delivery information mappings may not be stored for some or all users, and instead may be dynamically generated (or updated) by the Item Type-To-Delivery Information Mapping Generator component when needed. In addition, the Delivery Address Information Retriever component may also be used when present to dynamically determine various delivery addresses that are associated with the user, such as to provide that information to that Mapping Generator component. Such delivery address information for a user can be obtained in a variety of ways, such as by accessing public or proprietary databases, by interacting with the client computing device in use by the user (e.g., such as to retrieve information from a stored address book for the user and/or to obtain information about electronic delivery addresses associated with the user for that client computing device), and/or by interacting with other client devices associated with the user.

After the Delivery Address Determiner component has identified one or more appropriate delivery address for each of the determined item types, the Delivery Address Determiner component may provide that information to the page server, such as to make all of those delivery addresses available as options to the user as a possible delivery address for the items. Alternatively, the Delivery Address Determiner component may provide additional processing before providing the information to the page server, such as by using user preference information or other means to determine a degree of appropriateness of each of the identified delivery addresses (e.g., in order to rank the delivery addresses in order of appropriateness) and/or to select a most appropriate of the delivery addresses. The Delivery Address Determiner component may perform such additional processing in a variety of ways, such as in an automated manner (e.g., by interacting with the client computing device) and/or by retrieving information from the user in an interactive manner. After performing such additional processing, the Delivery Address Determiner component can then provide information about the ranked delivery addresses and/or selected delivery address to the page server and/or the ordering system. The additional processing may also include identifying one or more procurement options that include each of the identified, ranked, and/or selected delivery addresses, and provide information about those procurement options to the page server and/or the ordering system, whether in addition to or instead of direct indications of the delivery addresses.

The page server and/or ordering system can use the provided information in a variety of ways, such as by presenting multiple delivery addresses or procurement options as options to the user for selection, by presenting a single delivery address or procurement option to the user as a default or for confirmation, or by using a single delivery address or procurement option as the specified delivery address or specified procurement option for the order (e.g., without confirmation by the user).

The Delivery Address Determiner component may similarly determine one or more appropriate delivery addresses and/or procurement options in situations other than for a potential order, such as for an actual order after the ordering process has been initiated but not completed (e.g., while the items of the order are stored in an intermediate stage, such as a shopping cart) or after an order has been completed (e.g., without specification of a delivery address).

In addition, the Delivery Manner Determiner component can operate in a similar manner to the Delivery Address Determiner component in order to provide indications of one or more appropriate delivery manners and/or procurement options that include instructions for such delivery manners, such as in response to indications of potential orders or orders from the page server and/or ordering system. For example, the Delivery Manner Determiner component can similarly use item type information and a mapping database to select one or more appropriate delivery manners, and can use user preference information or other techniques to select one or more of multiple appropriate delivery manners. After selecting one or more appropriate delivery manners, the Delivery Manner Determiner can then similarly provide that information to the page server and/or ordering system for their use.

As previously noted, the ordering system can interact with various physical item distribution centers and/or electronic item distribution server computer systems to deliver items as appropriate to recipients. For example, when one or more of the items in an order are physical items, the ordering system can interact with an appropriate physical item distribution center to provide physical delivery of the ordered items to an appropriate physical delivery location 669 for a recipient that corresponds to one of the physical delivery addresses. Similarly, when one or more of the items in an order are electronic items, an appropriate electronic item distribution server computer system can transmit those items in electronic form to an appropriate electronic delivery address for the recipient, such as the client computer system in use by the user and/or one or more other computing devices 667 that are associated with that user or other recipient.

Those skilled in the art will appreciate that computer systems and computing devices 600, 660, 667 and 670 are merely illustrative and are not intended to limit the scope of the present invention. For example, computer system 600 may be connected to other devices that are not illustrated, including through one or more networks such as the Internet or via the World Wide Web (WWW). In the illustrated embodiment, systems interact over the Internet by sending HTTP messages and exchanging Web pages. Those skilled in the art will appreciate that the techniques of the system can be used in various environments other than the Internet, such as an electronic mail environment. In addition, a "client" or "server" may comprise any combination of hardware or software that can interact, including computers, network devices, internet appliances, PDAs, wireless phones, pagers, electronic organizers, television-based systems and various other consumer products that include inter-communication capabilities. Moreover, the functionality provided by the illustrated system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the system components or data structures may also be stored (e.g., as instructions or structured data) on a computer-readable medium, such as a hard disk, a memory, a network, or a portable article to be read by an appropriate drive. The system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 7:
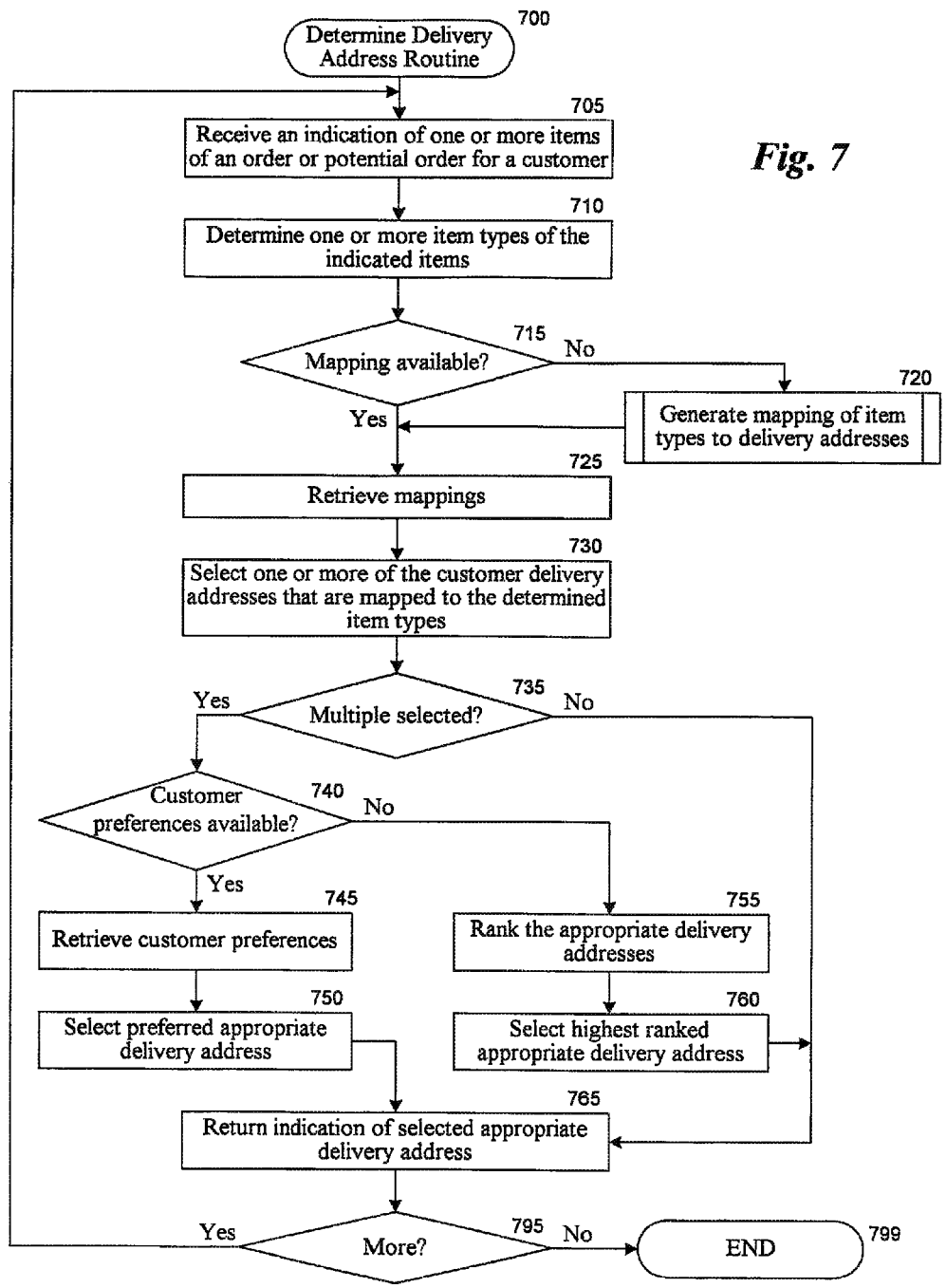
FIG. 7 is a flow diagram of an embodiment of a Determine Delivery Address routine.

FIG. 7 is a flow diagram of an embodiment of a Determine Delivery Address routine 700. The routine receives an indication of one or more items for an order or potential order for a customer (or user), and automatically determines an appropriate delivery address for the order based on item types of the items. The routine begins at step 705 where an indication is received of one or more items of an order or potential order for a customer. The routine continues to step 710 to determine one or more item types of the indicated items. The routine then continues to step 715 to determine if a mapping is available from the determined item types to one or more appropriate delivery addresses associated with the customer. If not, the routine continues to step 720 to execute a routine to generate a mapping of the determined item types to delivery addresses associated with the customer. In some embodiments, the routine may generate mappings for all item types, while in other embodiments, the routine may generate mappings only for the determined item types. Similarly, in some embodiments, the routine may use all available delivery addresses that are associated with the customer as part of the mapping, while in other embodiments the routine may be restricted to only a more limited set of delivery addresses (e.g., if indications of delivery addresses associated with the customer are retrieved and supplied to the routine).

After step 720, or if it was instead determined in step 715 that a mapping was available, the routine continues to step 725 to retrieve the mappings from the determined item types to the appropriate delivery addresses associated with the customer. The routine then continues to step 730 to select one or more of the customer delivery addresses that are mapped to the determined item types. In some embodiments, only a single delivery address will be mapped to each item type. In the illustrated embodiment, multiple delivery addresses may be identified based on multiple delivery addresses that are mapped to a single item type and/or on delivery addresses mapped to multiple determined item types. However, in the illustrated embodiment the routine 700 returns only a single appropriate delivery address, and so if multiple delivery addresses were identified in step 730, steps 735-760 are executed to select only one of those multiple delivery addresses. In other embodiments, multiple delivery addresses could be returned by the routine, such as by ranking a degree of appropriateness of all of the delivery addresses so that the delivery addresses could be made available as options to the customer in order of their degree of appropriateness.

In the illustrated embodiment, the routine continues to step 735 to determine if multiple delivery addresses were identified in step 730. If so, the routine continues to step 740 to determine if customer preference information is available that would allow a single delivery address to be selected. If so, the routine continues to step 745 to retrieve that customer preference information, and in step 750 uses the customer preference information to select a most preferred of the appropriate delivery addresses. If it was instead determined in step 740 that such customer preference information was not available, the routine continues to step 755 to rank the selected appropriate delivery addresses, such as based on available information that is specific to the customer (e.g., to reflect customer preferences or past customer behavior) or instead on information common to multiple users. After the selected appropriate delivery addresses are ranked, the routine continues to step 760 to select the highest ranked appropriate delivery address to be returned. After steps 750 or 760, or if it was instead determined in step 735 that a single delivery address was selected in 730, the routine continues to step 765 to return an indication of the single selected appropriate delivery address for the indicated items. The routine then continues to step 795 to determine whether to continue, and if so returns to step 705. If not, the routine continues to step 799 and ends.

Figure 8:
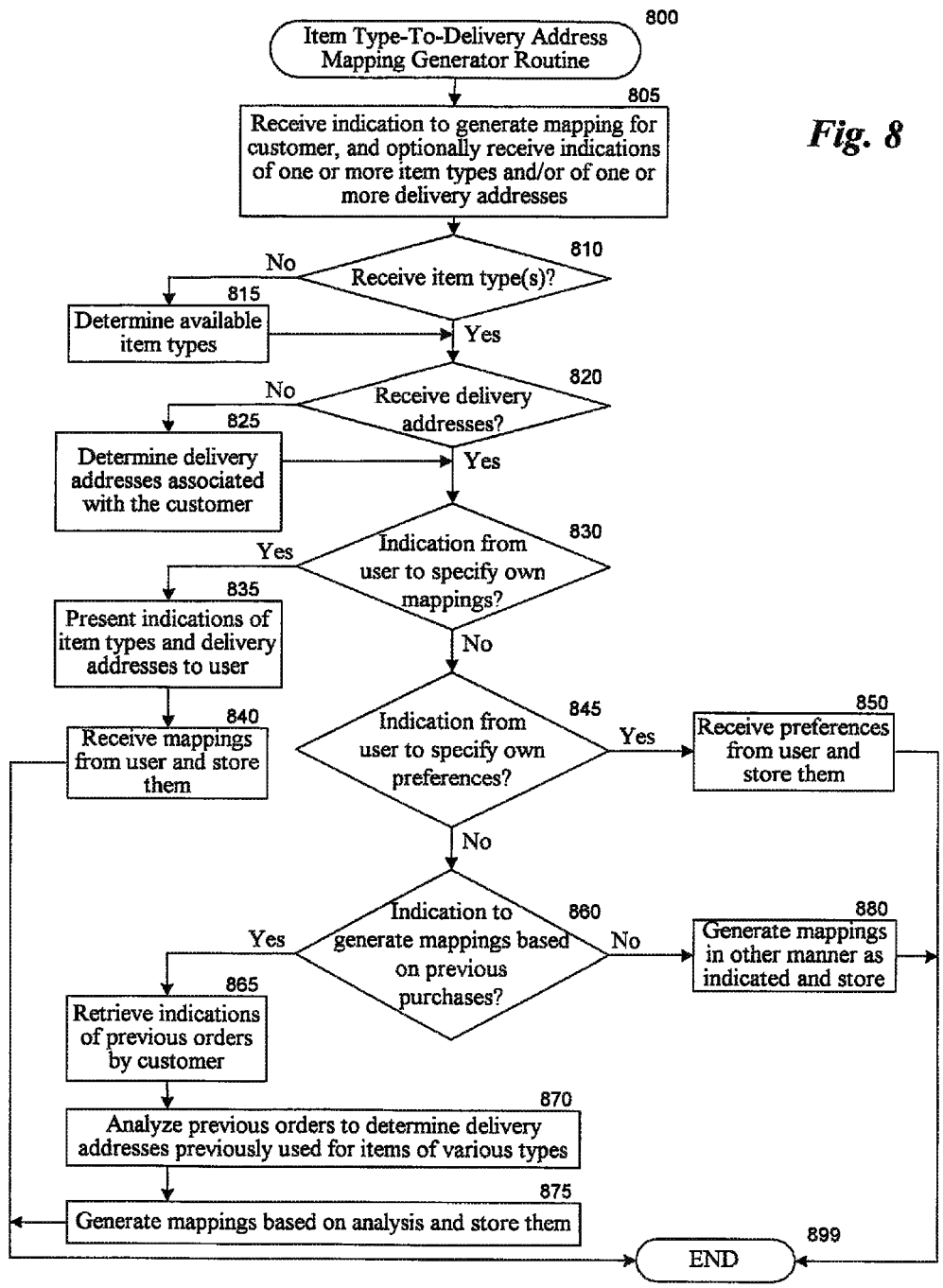
FIG. 8 is a flow diagram of an embodiment of an Item Type-To-Delivery Address Mapping Generator routine.

FIG. 8 is a flow diagram of an embodiment of an Item Type-To-Delivery Address Mapping Generator routine 800. The routine receives indications to generate mappings for a customer from item types to addresses associated with that customer, such as from the Determine Delivery Address routine 700 or from a user. In response, the routine generates such mappings in one or more of a variety of ways, and stores the mappings for future use. The routine begins at step 805 where an indication is received to generate mappings for a customer. In addition, indications may optionally be received of one or more item types and/or one or more delivery addresses that are to be used during the generating. In step 810, the routine determines whether item types to be used were received, and if not the routine continues to step 815 to determine available item types. After step 815, or if it was determined in step 810 that item types were received, the routine continues to step 820 to determine whether delivery addresses to be used were received in step 805. If not, the routine continues to step 825 to determine various delivery addresses that are associated with a customer. As previously discussed, such delivery addresses can be determined in various ways, such as delivery addresses previously defined explicitly by the customer, delivery addresses from an address book of the customer, delivery addresses to which the customer has previously had orders delivered, and/or delivery addresses automatically discovered by the routine (e.g., by interacting with one or more computing devices associated with the customer and/or accessible databases having information associated with the customer).

After step 825, or if it was instead determined in step 820 that delivery addresses were received in step 805, the routine continues to step 830 to determine whether the indication received in step 805 was from a user to interactively specify their own mappings. If so, the routine continues to step 835 to present indications to the user of the item types and the delivery addresses, and to receive from the user in step 840 indications of associations between the item types and the delivery addresses that are then stored for later use. If it was instead determined in step 830 that the indication was not from the user to specify their own mappings, the routine continues to step 845 to determine whether the indication received in step 805 was from a user to specify customer preference information related to delivery addresses that can be used for later determining or ranking of appropriate delivery addresses. If so, the routine continues to step 850 to receive such preference information from the user and to store that information for later use.

If it was instead determined in step 845 that the indication received in step 805 was not from a user to specify preference information, the routine continues to step 860 to determine whether the indication was to automatically generate mappings based on previous purchases of a customer (e.g., from the Determine Delivery Address routine 700). If so, the routine continues to step 865 to retrieve indications of previous orders that were made by that customer. The routine then continues to step 870 to analyze the previous orders to determine delivery addresses that were previously used for items of various types, such as to detect patterns in such previous usage. The routine then continues to step 875 to generate associations between item types and delivery addresses based on the analysis, and to store those associations for later use. If it was instead determined in step 860 that the indication received in step 805 was not to generate mappings based on previous purchases, the routine continues to step 880 to generate mappings from the item types to delivery information in another manner as indicated, and to then store those mappings for later use. Those mappings could be generated in a variety of other indicated ways, as previously discussed, such as based on associations between types of delivery addresses and types of items (e.g., mapping types of electronic items to compatible types of electronic delivery addresses) and/or based on typical mappings of other users between types of items and types of delivery addresses. After steps 840, 850, 875, or 880, the routine continues to step 899 and ends.

In other embodiments, additional types of functionality may be provided. For example, after mappings have been automatically determined for a user, the routine may allow that user to review and revise those mappings. Conversely, after a user has explicitly indicated mappings for themselves, the routine may in other embodiments review and update those mappings in an automated manner (e.g., to provide mappings for item types that were not provided by the user and/or to override user indications when appropriate). In addition, other types of delivery information than delivery addresses can similarly be generated in mappings and used as part of an ordering process. For example, in step 880, mappings could be generated between item types and various types of delivery manners, such as a class of physical delivery (e.g., next-day service) or various techniques to be used in conjunction with electronic transmission of an electronic item (e.g., access information and/or types of transmission or encoding protocols to be used). Moreover, appropriate information of various types other than delivery address and delivery manner could additionally be provided based on previous explicit user indications and/or analysis of previous behavior, such as types of messages to be included in gifts and/or types of wrapping to be used for gifts.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. For example, the server system can map a client identifier to multiple customers who have recently used the client system. The server system can then allow the user to identify themselves by selecting one of the mappings based preferably on a display of partial purchaser-specific order information. Finally, the purchaser can be alternatively identified by a unique customer identifier that is provided by the customer when the customer initiates access to the server system and sent to the server system with each message. This customer identifier could be also stored persistently on the client system so that the purchaser does not need to re-enter their customer identifier each time access is initiated.

Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

What is claimed is:

1. One or more computer memories storing program instructions that when executed by one or more computers cause the one or more computers to:
   automatically generate and maintain, in a database, a data structure for use in determining appropriate delivery addresses for items, the data structure comprising a multiplicity of entries respectively associated with distinct users of an item ordering service, wherein the individual entries of the data structure contain information indicating an association between an item type and one or more delivery addresses that are associated with the respective one of the distinct users with which the individual entries are respectively associated;
   wherein to automatically generate and maintain the data structure in the database, the program instructions further cause the one or more computers, for individual ones of the distinct users of the item ordering service, to:
   analyze, based on interaction with one or more computing devices that store associations between delivery addresses for previous orders and the one or more items of those orders, previous orders by the user to detect one or more patterns from addresses that were previously used for delivery of items of various types to delivery addresses of the user;
   generate a plurality of mappings for the user that each map a distinct item type to a distinct delivery address of a plurality of addresses associated with the user, wherein to generate the plurality of mappings the program instructions further cause the one or more computers to determine item-type-to-delivery-address relationships for the user based at least in part on the detected one or more patterns;
   store, to the database, the plurality of mappings in one or more entries of the data structure associated with the user;
   subsequent to said generate the plurality of mappings and said store the mappings,
   revise one or more of the plurality of automatically-generated mappings based at least in part on received update information, wherein to revise the one or more of the plurality of automatically-generated mappings the program instructions further cause the one or more computers to:
   receive update information associated with the user that is indicative of a relationship between one or more item types and one or more delivery addresses associated with the user; and
   in response to said receive the update information, update one of the stored mappings, wherein to update the stored mappings, the program instructions further cause the one or more computers to determine the relationship indicated by the received update information; and
   transmit, over a network and based at least in part on the data structure in the database, one or more of the one or more delivery addresses to which an item type is mapped, wherein the entries respectively associated with the distinct users are accessible for determination of appropriate delivery addresses for items for which the distinct users indicate potential orders, so that when a particular user indicates a potential order on a display of a graphical user interface for one or more items of an item type, one or more of the one or more delivery addresses to which the item type is mapped in the entry associated with that particular user can be selected from the display of the graphical user interface as being one or more potentially appropriate delivery addresses for the indicated one or more items.

2. The computer memories of claim 1, wherein individual entries of the multiplicity of entries further contain, per individual entry, information indicating one or more delivery manners for use with at least one of the one or more delivery addresses to which the mapping stored in the individual entry maps one or more item types for the distinct user respectively associated with that individual entry.

3. The computer memories of claim 1, wherein the program instructions cause the one or more computers to generate or update the mapping for the user automatically, without receiving an explicit indication from the user of an item-type-to-delivery-address relationship.

4. The computer memories of claim 1, wherein the program instructions cause the one or more computers to generate or update the mapping for the user based on receiving an explicit indication from the user of an item-type-to-delivery-address relationship.

5. The computer memories of claim 1, wherein the existing information associated with the user includes delivery addresses, and the program instructions further cause the one or more computers to acquire the delivery addresses from at least one of:
   a public or proprietary database;
   a client computing device used by the user;
   a profile associated with the user; or
   a record of electronic devices associated with the user.

6. The computer memories of claim 1, wherein the existing information associated with the user includes one or more items offered to the user for ordering from the item ordering service.

7. The computer memories of claim 1, wherein the existing information associated with the user includes information about the user's past behavior when ordering items, and the one or more item-type-to-delivery-address relationships for the user are determined from inferences based on analyzing the user's past behavior when ordering items.

8. The computer memories of claim 1, wherein said determining the one or more item-type-to-delivery-address relationships for the user from existing information associated with the user is based on at least one of:
   indications from the user specifying one or more specific delivery addresses for one or more specific item types;
   indications of item-type-to-delivery-address relationships for one or more recipients of orders from the user, wherein the one or more recipients are distinct from the user;
   associations between types of items and types of delivery addresses that depend on properties of particular types of items that make those particular types of items typically compatible with particular types of delivery addresses; or
   typical mappings of other users between types of items and types of delivery addresses.

9. The computer memories of claim 1, wherein the program instructions and the mappings stored in the data structure are configured to cause the one or more computers to perform said selection of one or more of the one or more delivery addresses as being one or more potentially appropriate delivery addresses for the indicated one or more items based, at least partially, on one or more of:
  a current time at which the particular user indicates the potential order; or
  a current physical location of the particular user when the particular user indicates the potential order.

10. A method, comprising:
  performing, by one or more computers, for individual users of an item ordering service:
  automatically generating, in a database, a plurality of mappings per user, wherein the plurality of mappings generated for the user each map one or more item types to one or more delivery addresses associated with the user;
  wherein automatically generating comprises:
  analyzing, based on interaction with one or more computing devices that store associations between delivery addresses for previous orders and the one or more items of those orders, previous orders by the user to detect one or more patterns from addresses that were previously used for delivery of items of various types to delivery addresses of the user;
  determining item-type-to-delivery-address relationships for the user from existing information associated with the user based at least in part on the detected one or more patterns; and
  storing, to the database, the plurality of mappings generated for the user in a data structure;
  subsequent to said generating and storing the mapping,
  revising one or more of the plurality of automatically-generated mappings based at least in part on received update information, revising comprising:
  receiving update information associated with the user that is indicative of a relationship between one or more item types and one or more delivery addresses associated with the user; and
  in response to said receiving the update information, updating one or more of the stored plurality of mappings, wherein said updating comprises determining the relationship indicated by the received update information; and
  transmit providing access, over a network, one or more of the one or more delivery addresses to which an item type is mapped, wherein the mappings generated for the individual ones of the users are accessible for determination of appropriate delivery addresses for items for which the individual ones of the users indicate potential orders, so that when a particular user indicates a potential order on a display of a graphical user interface for one or more items of an item type, one or more of the one or more delivery addresses to which the item type is mapped in the plurality of mappings generated for the particular user can be selected from the display of the graphical user interface as being one or more potentially appropriate delivery addresses for the indicated one or more items.

11. The method of claim 10, wherein the one or more delivery addresses associated with the user include one or more electronic delivery addresses, and at least one of the plurality of mappings stored for the user maps one or more electronic item types to one or more electronic delivery addresses.

12. The method of claim 10, wherein the mapping stored for the user maps at least one single item type to multiple delivery addresses.

13. The method of claim 10, wherein at least one of the plurality of mappings stored for the user maps multiple different item types to a single delivery address or to a single group of delivery addresses.

14. The method of claim 10, wherein the update information comprises feedback from the user indicating that the user has chosen a delivery address for an ordered item type that is different from a delivery address initially selected for the user as being a potentially appropriate delivery address for that ordered item type.

15. The method of claim 10, further comprising adjusting future determinations of potentially appropriate delivery addresses for an ordered item type based on said updating the stored plurality of mappings.

16. A system, comprising:
  a processor; and
  a memory coupled to the processor, wherein the memory stores program instructions that, when executed by the processor, cause the system to, for individual users of an item ordering service:
  automatically generate, in a database, a plurality of mappings per user, wherein the plurality of mappings generated for the user each map one or more item types to one or more delivery addresses associated with the user;
  wherein automatically generate comprises:
  analyze, based on interaction with one or more computing devices that store associations between delivery addresses for previous orders and the one or more items of those orders, previous orders by the user to detect one or more patterns from addresses that were previously used for delivery of items of various types to delivery addresses of the user;
  determine one or more item-type-to-delivery-address relationships for the user from existing information associated with the user based at least in part on the detected one or more patterns; and
  store, to the database, the plurality of mappings generated for the user in a data structure;
  subsequent to said generate and store the mapping,
  revise one or more of the plurality of automatically-generated mappings based at least in part on received update information, wherein revise comprises:
  receive update information associated with the user that is indicative of a relationship between one or more item types and one or more delivery addresses associated with the user; and
  in response to said receive the update information, update the stored plurality of mappings, wherein said update comprises determine the relationship indicated by the received update information; and
  transmit provide access, over a network, one or more of the one or more delivery addresses to which an item type is mapped, wherein the mappings generated for the individual ones of the users are accessible for determination of appropriate delivery addresses for items for which the individual ones of the users indicate potential orders, so that when a particular user indicates a potential order on a display of a graphical user interface for one or more items of an item type, one or more of the one or more delivery addresses to which the item type is mapped in the plurality of mappings generated for the particular user can be selected on the display of the graphical user interface as being one or more potentially appropriate delivery addresses for the indicated one or more items.

17. The system of claim 16, wherein, when executed by the processor, the program instructions further cause the system to, for individual ones of the users of an item ordering service: rank potential appropriateness of delivery addresses for one or more item types potentially ordered by the user based on the plurality of mappings generated for the user.

18. The system of claim 16, wherein the update information associated with the user includes an assignment of one or more delivery addresses to one or more item types that is specified by the user.

19. The system of claim 16, wherein said update the plurality of mappings stored for the user is causes by the program instructions before, during, or after an ordering process initiated by the user.

20. The system of claim 16, wherein the delivery addresses associated with the user include one or more addresses at which the user can receive items and one or more addresses at which other recipients can receive items ordered by the user.

\* \* \* \* \*